US008793653B2

(12) United States Patent
Balasubramanian et al.

(10) Patent No.: US 8,793,653 B2
(45) Date of Patent: Jul. 29, 2014

(54) PROGRAM CODE LIBRARY SELECTION IN AN INTEGRATED DEVELOPMENT ENVIRONMENT

(71) Applicant: International Business Machines Corporation, Armonk, NY (US)

(72) Inventors: Swaminathan Balasubramanian, Troy, MI (US); Rick A. Hamilton, II, Charlottesville, VA (US); Brian M. O'Connell, Research Triangle Park, NC (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 42 days.

(21) Appl. No.: 13/706,603

(22) Filed: Dec. 6, 2012

(65) Prior Publication Data

US 2014/0165034 A1 Jun. 12, 2014

(51) Int. Cl.
*G06F 9/44* (2006.01)
(52) U.S. Cl.
CPC ........................................ *G06F 8/71* (2013.01)
USPC ........................................... 717/121; 717/126
(58) Field of Classification Search
CPC ............................... G06F 8/71; G06F 9/44505
USPC .................................................. 717/121, 126
See application file for complete search history.

(56) References Cited

U.S. PATENT DOCUMENTS

| 6,604,110 | B1 | 8/2003 | Savage et al. |
| 7,383,269 | B2 | 6/2008 | Swaminathan et al. |
| 7,546,598 | B2 * | 6/2009 | Blumenthal et al. ............. 718/1 |
| 7,962,470 | B2 | 6/2011 | Degenkolb et al. |
| 8,065,315 | B2 | 11/2011 | Rapp et al. |
| 8,145,673 | B2 | 3/2012 | Bloesch et al. |
| 2008/0201330 | A1 | 8/2008 | Bloesch |
| 2009/0249023 | A1 * | 10/2009 | Qiao et al. ............. 711/216 |
| 2012/0110030 | A1 | 5/2012 | Pomponio |

OTHER PUBLICATIONS

Blackburn et al., "The DaCapo Benchmarks: Java Benchmarking Development and Analysis", 2006.*
Kokholm, "An extended library of collection classes for .NET", 2004.*
Mell, P. et al., "The NIST Definition of Cloud Computing", National Institute of Standards and Technology, Information Technology Laboratory, Vers. 15, Oct. 7, 2009, 2 pages.

(Continued)

*Primary Examiner* — Phillip H Nguyen
(74) *Attorney, Agent, or Firm* — William E. Schiesser; Keohane & D'Alessandro, PLLC

(57) ABSTRACT

An approach for integrated development environment (IDE)-based program code library selection in a networked computing environment (e.g., a cloud computing environment) is provided. Under this approach, a search results file is received in a library selection IDE from a library searching IDE. It may then be determined whether to perform a micro-benchmarking on the at least one method and the at least one class. Based on the determination, the micro-benchmarking may then be performed on the at least one method and the at least one class. A set of code style similarity scores may then be calculated that indicate a similarity between the at least one method and the at least one class with the methods and classes of a second program code file. An ordered list of the methods and classes of the second program code file may then be provided.

20 Claims, 5 Drawing Sheets

(56) References Cited

OTHER PUBLICATIONS

"Google Code Search FAQ", 4 pages. No authors cited. Publication date not cited. http:/www.google.com/help/faq_codesearch.html, retrieved date May 1, 2012.

"About Koders", Koders.com, 4 pages. No authors cited. Publication date not cited. http://corp.koders.com/about/, retrieved date May 16, 2012.

Zygkostiotis, Z. et al., "Semantic Annotation, Publication, and Discovery of Java Software Components: An Integrated Approach", Acadamia edu., 12 pages. Publication date not cited, 2009.

Keivanloo, I et al., Semantic Web—The Missing Link in Global Source Code Analysis?, Concordia University, 20 pages. Publication date not cited, 2012.

\* cited by examiner

PROGRAM CODE LIBRARY SELECTION IN AN INTEGRATED DEVELOPMENT ENVIRONMENT

TECHNICAL FIELD

Embodiments of the present invention relate to program code library selection. Specifically, embodiments of the present invention relate to an approach for integrated development environment (IDE)-based program code library selection in a networked computing environment (e.g., a cloud computing environment).

BACKGROUND OF THE INVENTION

A code repository is typically a searchable, categorized, and/or Internet accessible location that users may access to browse, search and download source or compiled library code. Uses of code repositories may include open source projects, proprietary development projects, and/or projects that create libraries for later use. A code annotation is a special form of syntactic metadata that can be added to source code. Classes, methods, variables, parameters, and/or code packages may be annotated. Unlike comments, annotations may be actionable in that they may be embedded in files generated by a compiler, and may be utilized by an execution environment to be retrievable at run-time.

Challenges may exist, however, when a program code library needs to be selected from among a set of program code libraries. Specifically, although multiple program code libraries may match a search query, it may be difficult to efficiently and/or accurately select a particular program code library from within an IDE.

SUMMARY

In general, embodiments of the present invention provide an approach for integrated development environment (IDE)-based program code library selection in a networked computing environment (e.g., a cloud computing environment). Under this approach, a search results file is received in a library selection IDE from a library searching IDE. The search results file typically includes at least one method and at least one class from a first program code file in the library searching IDE, and is associated with a set of attributes. It may then be determined whether to perform a micro-benchmarking on the at least one method and the at least one class. If the micro-benchmarking is performed, an associated micro-benchmark time and an invocation timestamp may then be stored in a computer storage device. A set of code style similarity scores that measures similarities between the at least one method and the at least one class with the methods and classes of a second program code file may then be calculated based on code syntax similarity. An ordered list of the methods and classes of the second program code file may then be provided based on the set of code style similarity scores, the micro-benchmarking, and the set of attributes.

A first aspect of the present invention provides a computer-implemented method for program code library selection in a networked computing environment, comprising: receiving a search results file in a library selection integrated development environment (IDE) from a library searching IDE, the search results file comprising at least one method and at least one class from a first program code file in the library searching IDE, and the search results file having a set of attributes; determining whether to perform a micro-benchmarking on the at least one method and the at least one class of the search results file, the determining being based on at least one of: a configuration of a second program code file in the library selection IDE, or a detected code pattern of the second program code file; performing, responsive to the determining, the micro-benchmarking on the at least one method and the at least one class, and storing an associated micro-benchmark time and an invocation timestamp in a computer storage device; calculating a set of code style similarity scores that indicated a similarity between the at least one method and the at least one class with the methods and classes of the second program code file based on code syntax similarity; and providing an ordered list of the methods and classes of the second program code file based on the set of code style similarity scores, the micro-benchmarking, and the set of attributes.

A second aspect of the present invention provides a system for program code library selection in a networked computing environment, comprising: a memory medium comprising instructions; a bus coupled to the memory medium; and a processor coupled to the bus that when executing the instructions causes the system to: receive a search results file in a library selection integrated development environment (IDE) from a library searching IDE, the search results file comprising at least one method and at least one class from a first program code file in the library searching IDE, and the search results file having a set of attributes; determine whether to perform a micro-benchmarking on the at least one method and the at least one class of the search results file, the determining being based on at least one of: a configuration of a second program code file in the library selection IDE, or a detected code pattern of the second program code file; perform, responsive to the determination, the micro-benchmarking on the at least one method and the at least one class, and store an associated micro-benchmark time and an invocation timestamp in a computer storage device; calculate a set of code style similarity scores that indicated a similarity between the at least one method and the at least one class with the methods and classes of the second program code file based on code syntax similarity; and provide an ordered list of the methods and classes of the second program code file based on the set of code style similarity scores, the micro-benchmarking, and the set of attributes.

A third aspect of the present invention provides a computer program product for program code library selection in a networked computing environment, the computer program product comprising a computer readable storage media, and program instructions stored on the computer readable storage media, to: receive a search results file in a library selection integrated development environment (IDE) from a library searching IDE, the search results file comprising at least one method and at least one class from a first program code file in the library searching IDE, and the search results file having a set of attributes; determine whether to perform a micro-benchmarking on the at least one method and the at least one class of the search results file, the determining being based on at least one of: a configuration of a second program code file in the library selection IDE, or a detected code pattern of the second program code file; perform, responsive to the determination, the micro-benchmarking on the at least one method and the at least one class, and store an associated micro-benchmark time and an invocation timestamp in a computer storage device; calculate a set of code style similarity scores that indicated a similarity between the at least one method and the at least one class with the methods and classes of the second program code file based on code syntax similarity; and provide an ordered list of the methods and classes of the second program code file based on the set of code style similarity scores, the micro-benchmarking, and the set of attributes.

A fourth aspect of the present invention provides a method for deploying a system for program code library selection in a networked computing environment, comprising: providing a computer infrastructure being operable to: receive a search results file in a library selection integrated development environment (IDE) from a library searching IDE, the search results file comprising at least one method and at least one class from a first program code file in the library searching IDE, and the search results file having a set of attributes; determine whether to perform a micro-benchmarking on the at least one method and the at least one class of the search results file, the determining being based on at least one of: a configuration of a second program code file in the library selection IDE, or a detected code pattern of the second program code file; perform, responsive to the determination, the micro-benchmarking on the at least one method and the at least one class, and store an associated micro-benchmark time and an invocation timestamp in a computer storage device; calculate a set of code style similarity scores that indicated a similarity between the at least one method and the at least one class with the methods and classes of the second program code file based on code syntax similarity; and provide an ordered list of the methods and classes of the second program code file based on the set of code style similarity scores, the micro-benchmarking, and the set of attributes.

BRIEF DESCRIPTION OF THE DRAWINGS

These and other features of this invention will be more readily understood from the following detailed description of the various aspects of the invention taken in conjunction with the accompanying drawings in which.

Figure 1:
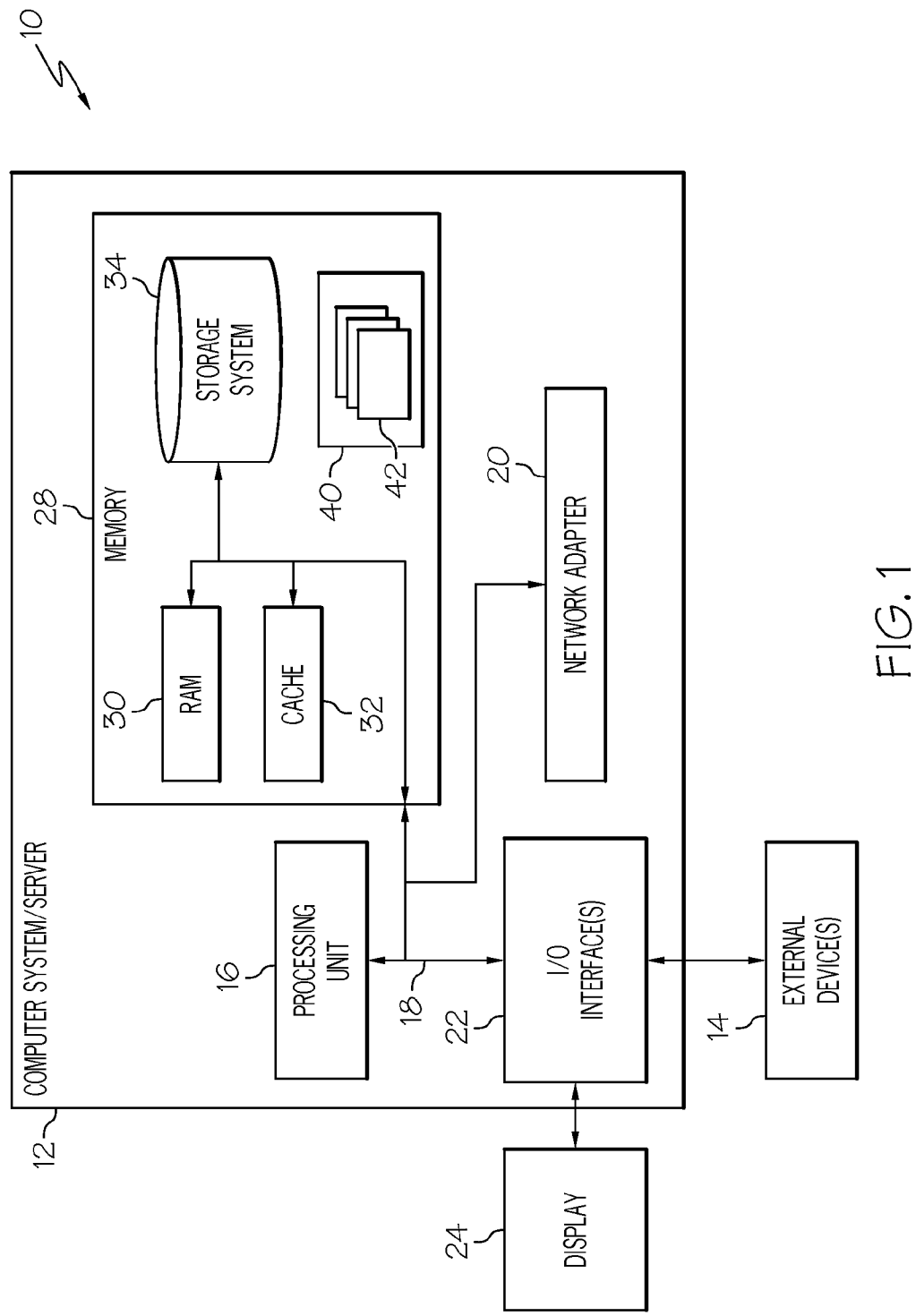
FIG. 1 depicts a computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

Illustrative embodiments will now be described more fully herein with reference to the accompanying drawings, in which exemplary embodiments are shown. This disclosure may, however, be embodied in many different forms and should not be construed as limited to the exemplary embodiments set forth herein. Rather, these exemplary embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The word "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

As indicated above, embodiments of the present invention provide an approach for integrated development environment (IDE)-based program code library selection in a networked computing environment (e.g., a cloud computing environment). Under this approach, a search results file is received in a library selection IDE from a library searching IDE. The search results file typically includes at least one method and at least one class from a first program code file in the library searching IDE, and is associated with a set of attributes. It may then be determined whether to perform a micro-benchmarking on the at least one method and the at least one class. If the micro-benchmarking is performed, an associated micro-benchmark time and an invocation timestamp may then be stored in a computer storage device. A set of code style similarity scores that measures similarities between the at least one method and the at least one class with the methods and classes of a second program code file may then be calculated based on code syntax similarity. An ordered list of the methods and classes of the second program code file may then be provided based on the set of code style similarity scores, the micro-benchmarking, and the set of attributes.

In a typical embodiment, code repositories and integrated development environments (IDEs) are augmented to provide enhanced searching. In an alternate embodiment, the teachings recited herein may be implemented by search engines rather than development environments. The embodiments of the present invention may further augment annotation systems to support tag-based descriptions of methods and classes. Still yet, in embodiments in which source code is available in addition to runtime libraries, descriptive tags may be automatically generated using known search indexing methodology. Furthermore, searching is refined through the use of an expectation annotation. It is understood that embodiments of the present invention may utilize code annotations (e.g., to program code, methods, classes, etc.) to express related attributes. A code annotation is a special form of syntactic metadata that can be added to source code. Classes, methods, variables, parameters, and/or code packages may be annotated. Unlike comments, annotations may be actionable in that they may be embedded in files generated by a compiler, and may be utilized by an execution environment to be retrievable at run-time.

Referring now to FIG. 1, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, mobile devices, global positioning systems (GPS), GPS-enable devices, multiprocessor systems, microprocessor-based systems, set top boxes, programmable consumer electronics, network PCs, minicomputer systems, mainframe computer systems, and distributed computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on, which perform particular tasks or implement particular abstract data types. Computer system/server 12 may be practiced in distributed computing environments where tasks are performed by remote processing devices that are linked through a communications network. In a distributed computing environment, program modules may be located in both local and remote computer system storage media including memory storage devices.

As shown in FIG. 1, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program code library selection program/utility 40, having a set (at least one) of program modules 42, may be stored in memory 28 by way of example, and not limitation, as well as an operating system, one or more application programs, other program modules, and program data. In general, program/utility 40 performs the function of the present invention as described herein. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
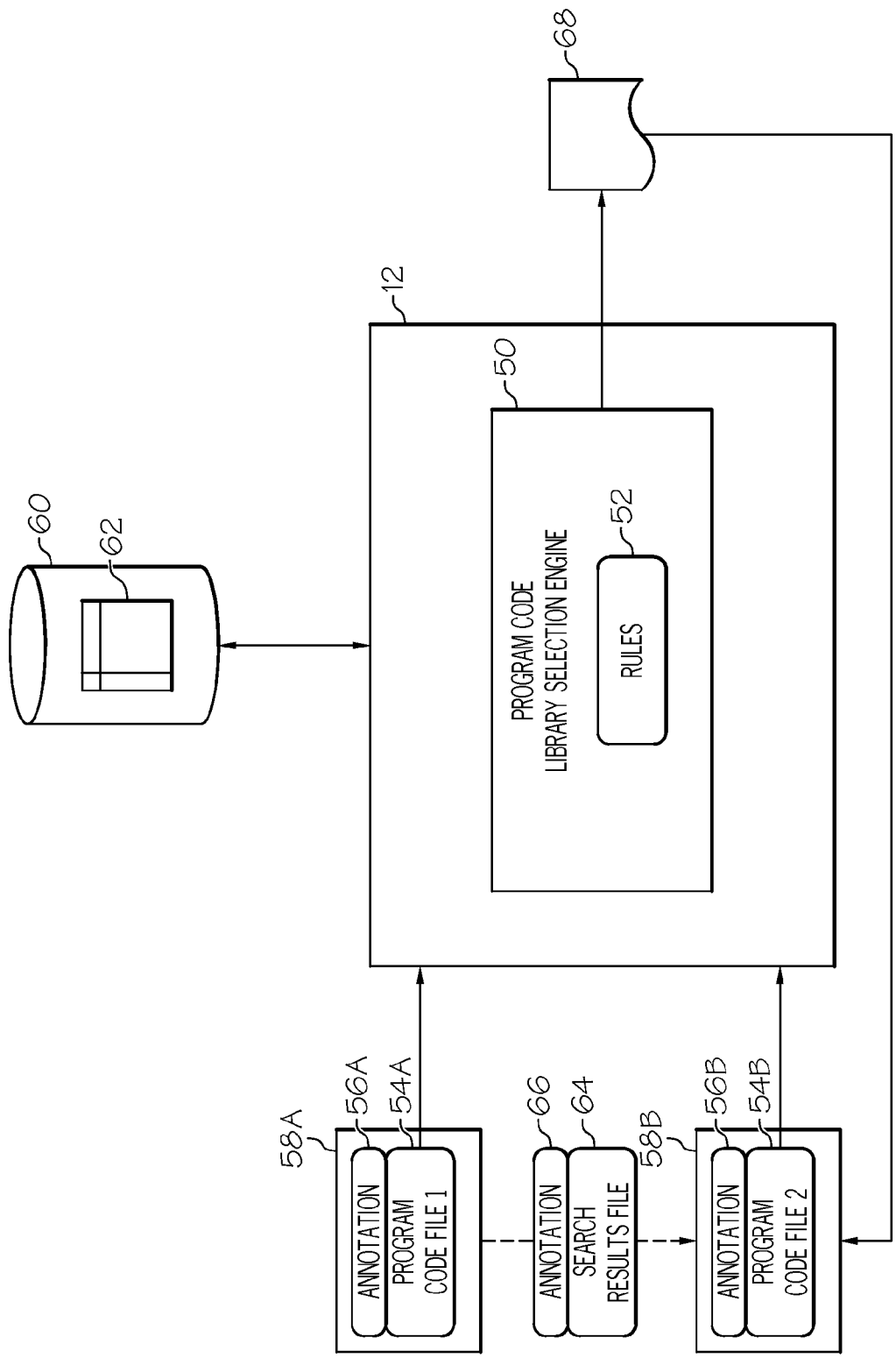
FIG. 2 depicts a system diagram according to an embodiment of the present invention.

Referring now to FIG. 2, a system diagram describing the functionality discussed herein according to an embodiment of the present invention is shown. It is understood that the teachings recited herein may be practiced within any type of networked computing environment (e.g., a cloud computing environment). A computer system/server 12, which can be implemented as either a stand-alone computer system, or as a networked computer system is shown in FIG. 2. In the event the teachings recited herein are practiced in a networked computing environment (e.g., a cloud computing environment), each client need not have a program code library selection engine (engine 50). Rather, engine 50 could be loaded on a server (e.g., payment processing server) or server-capable device that communicates (e.g., wirelessly) with the clients to provide library selection functionality hereunder. Regardless, as depicted, engine 50 is shown within computer system/server 12. In general, engine 50 can be implemented as program/utility 40 on computer system 12 of FIG. 1 and can enable the functions recited herein. As further shown, engine 50 (in one embodiment) comprises a rules and/or computational engine that processes a set (at least one) of rules/logic 52 and/or provides library selection functionality hereunder.

Along these lines, engine 50 may perform multiple functions similar to a general-purpose computer. Specifically, among other functions, engine 50 may (among other things): receive a search results file 64 in a library selection integrated development environment (IDE) 58B from a library searching IDE 58A, the search results file 64 comprising at least one method and at least one class from a first program code file 54A (e.g., having attributes/annotation 56A) in the library searching IDE 58A, and the search results file 64 having a set of attributes (e.g., a method and class name, an annotation, a popularity indicator, a rating indicator, a file size, an update frequency indicator, a last update timestamp, an indicator of popularity among a group of users, and/or a rating indicator among the group of users expressed as annotation 66); determine whether to perform a micro-benchmarking on the at least one method and the at least one class of the search results file 64, the determining being based on at least one of: a configuration of a second program code file 54B ((e.g., having attributes/annotation 56B) in the library selection IDE 58B, or a detected code pattern (e.g., complex code pattern) of the second program code file 54B; perform, responsive to the determination, the micro-benchmarking on the at least one method and the at least one class, and store an associated micro-benchmark time and an invocation timestamp (collective 62) in a computer storage device 60; calculate a set of code style similarity scores that indicated a similarity between the at least one method and the at least one class with the methods and classes of the second program code file 54B based on code syntax similarity; provide an ordered list 68 of the methods and classes of the second program code file 54B based on the set of code style similarity scores, the micro-benchmarking, and the set of attributes; provide ordered list 68 to library selection IDE 58B; and/or select a program code library based on the ordered list 68.

It is understood that the example shown in FIG. 2 is intended to be illustrative only. For example, engine 50 could be loaded in one or both IDEs 58A-B, or operate on a separate system as shown. Along these lines, engine 50 may facilitate all communications between IDEs 58A-B. For example, search results file 64 may be communicated through system 12, or directly between IDEs 58A-B. In the case of the latter, engine 50 may have access to IDEs 58A-B to perform the functions recited hereunder. It is thus understood that the precise architectural implementation shown in FIG. 2 is not intended to be limited and that similar underlying functionality may be achieved with various architectures.

Figure 3:
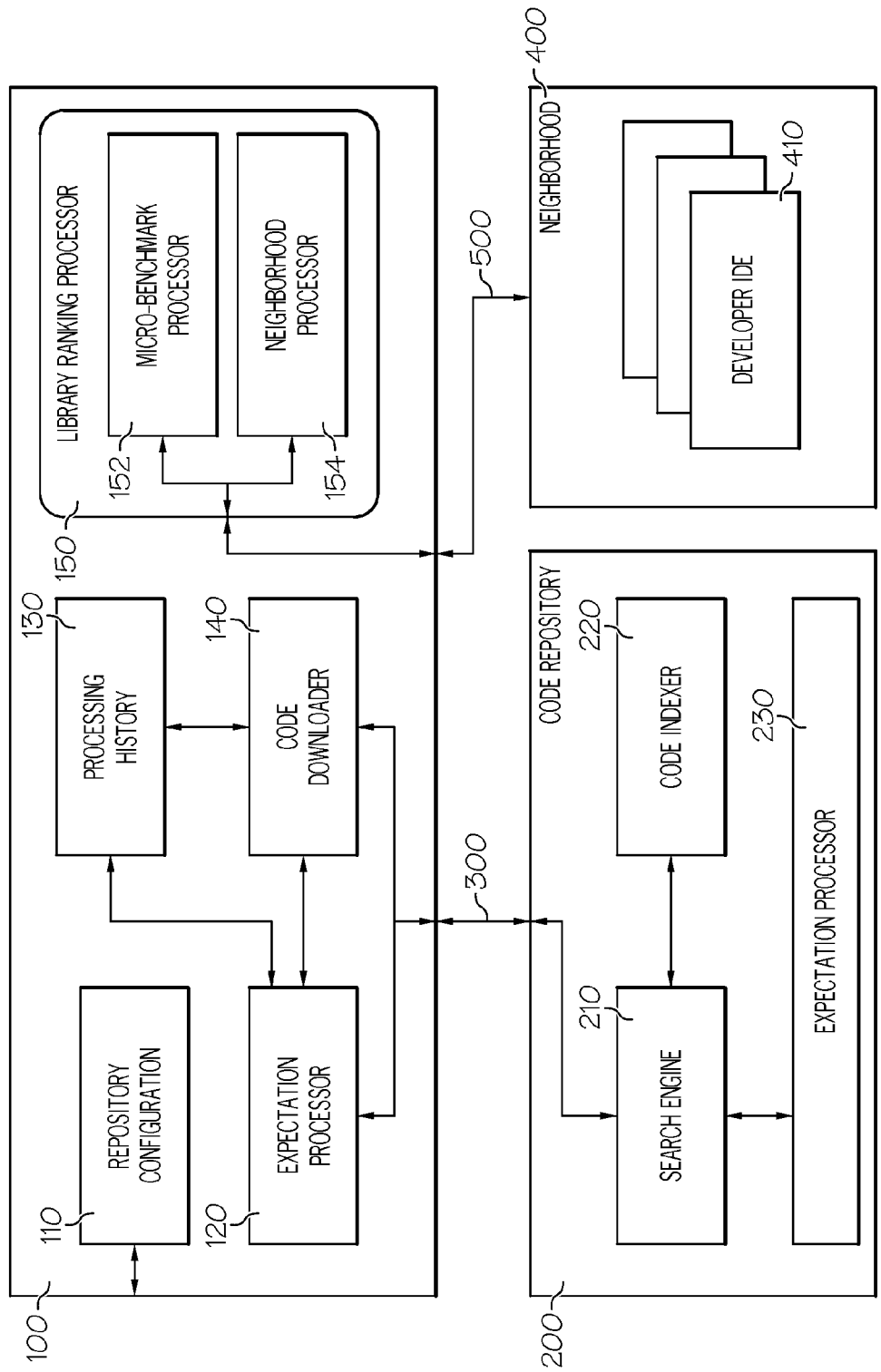
FIG. 3 depicts a more detailed diagram of the system of FIG. 2 according to an embodiment of the present invention.

Referring now to FIG. 3, a more detailed diagram of program 40 (FIG. 1) and/or engine 50 (FIG. 2) is shown. Specifically, FIG. 3 depicts program 40/engine 50 implemented via an IDE 100, code repository 200, and neighborhood 400 connected via connections 300 and 500. In one embodiment, connections 300 and/or 500 may represent one or more computing networks (e.g., cloud). IDE 100 may comprise a repository configuration 110, an expectation processor 120, a code downloader 140, a processing history 130 and a library ranking processor 150. Configuration 110 maintains a registry of available code repositories. The IDE may have repositories pre-loaded, which may be augmented by a developer or the like. Expectation processor 120 is used by the IDE when a registered repository is unable to support processing. IDE 100 may utilize code downloader 140 to obtain non-expectation annotation matches that may be then processed by expectation processor 120. As the developer interacts with the IDE 100, processing history 130 records transactions (e.g., search and download transactions). Library ranking processor 150 is typically utilized for performing computing (e.g., program code) library rankings based on code style analysis, popularity, size, and change rate. In addition, expectation processor 150 may utilize micro-benchmark processor 152 for performing micro-benchmarking and neighborhood processor 154 for ranking using neighborhood IDE history.

As further shown in FIG. 3, code repository generally comprises a search engine 210, a code indexer 220, and an expectation processor 230. Search engine 210 may receive search requests from IDEs such as IDE 100. Depending on the search request, search engine 210 may either utilize indexes created by code indexer 220 or expectation processor 230 to return matches. Neighborhood 400 comprises a set of IDEs 410 (e.g., developer IDEs). When ranking a library, IDE 100 may first dynamically assemble neighborhood 400. IDE 100 may then process histories on IDEs 410 to obtain prior micro-benchmarking results and frequency of library usage in neighborhood 400 to determine the ranking of the library.

Illustrative Example

This section will describe various functions performed by engine 50 according to an illustrative example hereunder.

Library Micro-Benchmark Ranking

This function assists a user in selecting a library that is an optimal fit for a proposed library invocation pattern. Depending on invocation location, embodiments hereunder may perform a micro benchmarking of all or a subset of all matching libraries. Multiple approaches/techniques may be utilized hereunder to determine if a micro benchmarking is performed. Such factors may include one or more of the following:

Automatic detection of micro-benchmark applicability: Upon searching for a program code library, this function may be invoked to determine if a micro-benchmark may have applicability. For example, if a program code library is only called once to initialize a static field, a potential performance impact of even the slowest matching library would be negligible. However, if a library function is called within a loop, specifically a potentially tight loop, then a micro-benchmark may be of interest to the developer. Static analysis tools may be used to discern the call site of library invocation and discern if the library will be invoked within a loop structure. Furthermore, static analysis can reveal the number of additional items within that loop structure and their performance characteristics such as their worst case runtime notation. If such static analysis determines that the library invocation may have a meaning impact on the loop performance, a set of micro-benchmarks may be performed across located libraries and presented to the user to aid in library selection.

Manual invocation of micro-benchmark: Some users focused on performance may opt to manually invoke micro-benchmarking. Either because the user wishes to have the most performing code possible or because the user knows the loop structure may change significantly, requiring a program code library with optimal run time.

Micro-benchmarking: This function performs the actual micro-benchmarking of the matching libraries. Specifically, this function is supplied with a list of downloaded libraries and function calls within those program code libraries to test. In most embodiments, the function calls are measured in a tight loop with the parameters supplied to select the library. Additionally, the system may generate random parameters for primitive object types. In any event, the system may enlist users' help to create mock objects for program code libraries that require complex objects to be proved as part of the function call. After completion of micro-benchmarking the user may be supplied with an ordered ranking of the libraries by average method invocation time. This may be supplied in a table form along with the results of the other ranking system described below.

Library Code Style Ranking

This function is utilized to assist a user in selecting the library that is the optimal fit for their surrounding component and code base coding style. Static analysis methods may be invoked to determine the style of code used within the component or more broadly the developing code base. For example, a user may implement the object construction pattern called the inner builder pattern rather than the telescoping constructor or beans pattern for creation of complex objects. In another scenario, the surrounding code base may use the fluid method pattern rather than a void return pattern. These and other coding styles may be noted by the IDE after receiving a list of matching program code libraries from a previous search. Those libraries may be inspected and the program code libraries that use the same styles may be ranked above other program code libraries. In general, a code base that makes method calls into libraries of a similar style is easier to maintain than a code base that is forced to use alternate styles when invoking library functions.

Library Popularity Ranking

This function may use multiple techniques to rank an item by download popularity. Such popularity may be gauged based on affinity groups of users, time periods, and/or any other criteria.

Library Size Ranking

This function may utilize multiple techniques to rank an item by download size. For example, a user executing a single function within a library may not wish to add a 5 MB library to their runtime when a 2 MB library is available that provides the same function.

Library Change Rate Ranking

This function may utilize multiple techniques to rank an item by activity or change rate. Some developers may wish to avoid libraries that are changing as it may alter and/or "break" the developer's code. Other developers may wish to avoid libraries that have been abandoned or become stagnant.

Library Ranking Using Neighborhood IDE History

This function may utilize a processing history of IDEs in the neighborhood of the developer's IDE to determine ranking. In a typical embodiment, the neighborhood is determined contextually based on whether the developer is working on a specific project/engagement, or contributing to an open source development effort, or freelancing, or by the developer's location. Based on the context, neighborhood IDEs may be determined using a combination of Source Control Management (SCM) committers, private directories (such as a company's address book), developer's contacts, or using public tag repositories.

In an alternate embodiment, a neighborhood may be progressively broadened as history is scanned until a critical mass is reached. Once a neighborhood is assembled, the developer's IDE may access processing histories in the neighborhood to determine if the libraries in the search results have been used previously. For matching hits, the IDE may analyze one or more of the following factors: (1) prior micro-benchmarking results; and (2) frequency of library usage in the neighborhood to rank matches. Finally, the neighborhood can be constrained to specific development teams and examination of prior, empirical downloads or related satisfaction can be used to generate such a rating.

Figure 4:
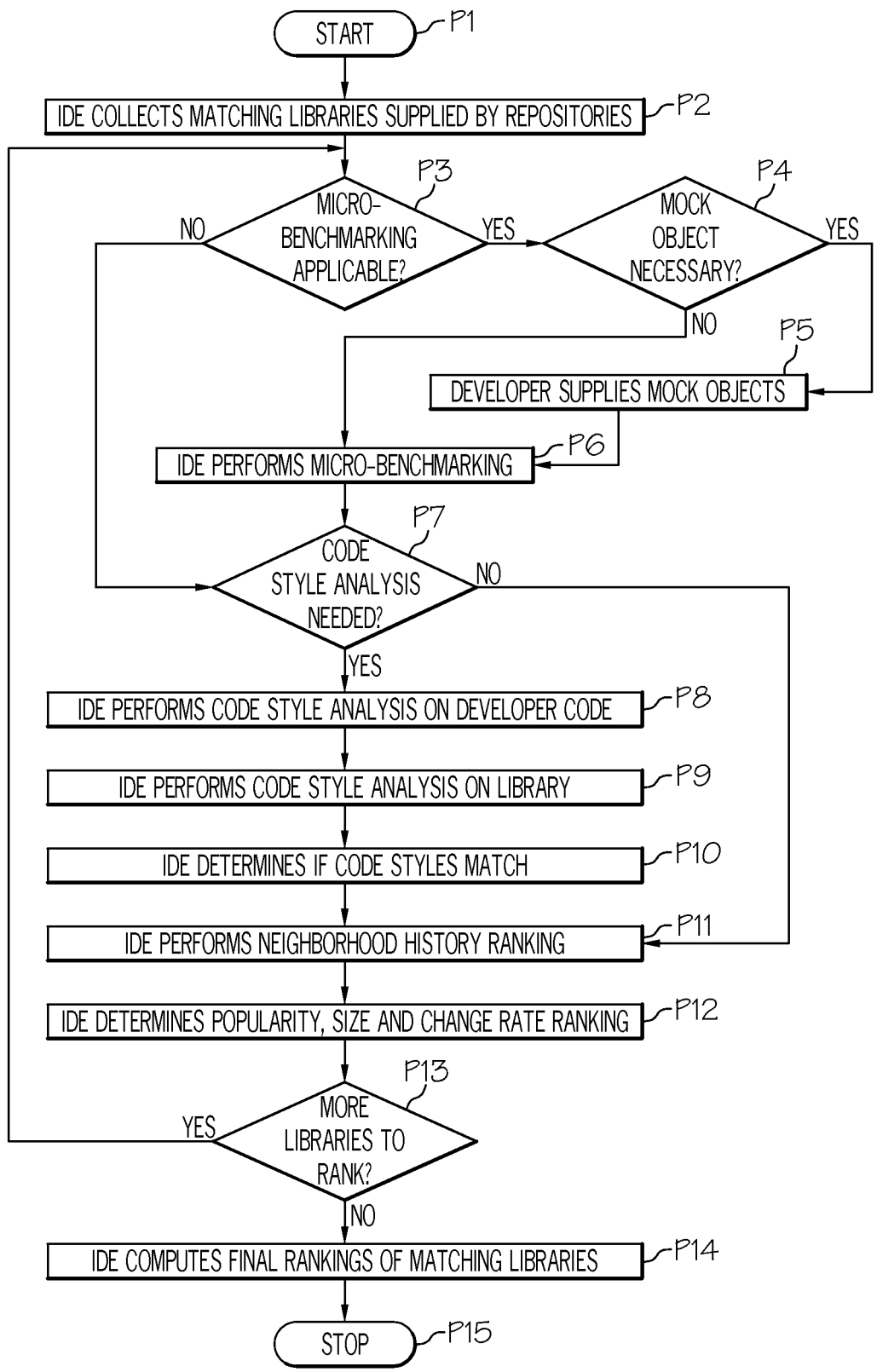
FIG. 4 depicts a method flow diagram according to an embodiment of the present invention.

Referring now to FIG. 4, a method flow diagram according to an embodiment of the present invention is shown. It is understood that any of these steps may be performed by engine 50 and/or IDEs hereunder (e.g., an IDE may utilize engine 50 and or incorporate engine 50 to perform these underlying functions). As depicted, in step P1, the process is started. In step P2, an IDE collects matching libraries supplied by repositories. In step P3, it is determined whether micro-benchmarking is applicable. If not, the process flows to step P7. If so, it is determined whether a mock object is necessary in step P4. If not, the process flows to step P6. If so, the developer supplies mock objects in step P5, and then the micro benchmarking is performed in step P6 (e.g., by IDE, engine 50, etc.). In step P7, it is determined whether code style analysis is needed. If not, the process may flow to step P11. If so, a code style analysis is performed on the developer code in step P8 (e.g., by IDE, engine 50, etc.). A code style analysis is then performed on the program code library in step P9 (e.g., by IDE, engine 50, etc.). In step P10, it is determined if a code style match exists (e.g., by IDE, engine 50, etc.). In step P11, a neighborhood history ranking is performed (e.g., by IDE, engine 50, etc.). In step P12, popularity, size, change rate, etc., are determined (e.g., by IDE, engine 50, etc.). In step P13, it is determined whether there are additional libraries to rank. If not, the process flows to step P14. If so, the process returns to step P3. In step P14, a final ranking of matching libraries is computed for the ordered list (e.g., by IDE, engine 50, etc.). The process may then end in step P15.

Figure 5:
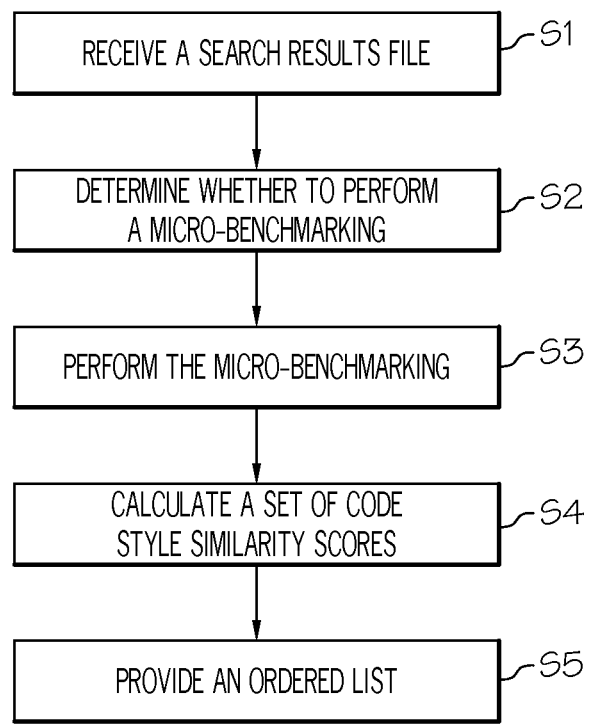
FIG. 5 depicts another method flow diagram according to an embodiment of the present invention.

Referring now to FIG. 5, another method flow diagram according to an embodiment of the present invention is shown (e.g., as enabled by engine 50 of FIG. 2). As depicted, in step S1, a search results file is received in a library selection integrated development environment (IDE) from a library searching IDE, the search results file comprising at least one method and at least one class from a first program code file in the library searching IDE, and the search results file having a set of attributes. In step S2, it is determined whether to perform a micro-benchmarking on the at least one method and the at least one class of the search results file, the determining being based on at least one of: a configuration of a second program code file in the library selection IDE, or a detected code pattern of the second program code file. In step S3, the micro-benchmarking is performed on the at least one method and the at least one class, and store an associated micro-benchmark time and an invocation timestamp in a computer storage device. In step S4, a set of code style similarity scores are between the at least one method and the at least one class with the methods and classes of the second program code file is calculated based on code syntax similarity. In step S5, an ordered list of the methods and classes of the second program code file is provided/generated based on the set of code style similarity scores, the micro-benchmarking, and the set of attributes.

While shown and described herein as an IDE-based program code library selection solution, it is understood that the invention further provides various alternative embodiments. For example, in one embodiment, the invention provides a computer-readable/useable medium that includes computer program code to enable a computer infrastructure to provide IDE-based program code library selection as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide IDE-based program code library selection functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for IDE-based program code library selection. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A computer-implemented method for program code library selection in a networked computing environment, comprising:
   receiving a search results file in a library selection integrated development environment (IDE) from a library searching IDE, the search results file comprising at least one method and at least one class from a first program code file in the library searching IDE, and the search results file having a set of attributes;
   determining whether to perform a micro-benchmarking on the at least one method and the at least one class of the search results file, the determining being based on at least one of: a configuration of a second program code file in the library selection IDE, or a detected code pattern of the second program code file;
   performing, responsive to the determining, the micro-benchmarking on the at least one method and the at least one class, and storing an associated micro-benchmark time and an invocation timestamp in a computer storage device;
   calculating a set of code style similarity scores that indicate a similarity between the at least one method and the at least one class with the methods and classes of the second program code file based on code syntax similarity; and
   providing an ordered list of the methods and classes of the second program code file based on the set of code style similarity scores, the micro-benchmarking, and the set of attributes.

2. The computer-implemented method of claim 1, further comprising selecting a program code library based on the ordered list.

3. The computer-implemented method of claim 1, the set of attributes comprising at least one of the following: a method and class name, an annotation, a popularity indicator, a rating indicator, a file size, an update frequency indicator, a last update timestamp, an indicator of popularity among a group of users, and a rating indicator among the group of users.

4. The computer-implemented method of claim 1, the code pattern comprising a complex code pattern.

5. The computer-implemented method of claim 1, the ordered list being provided to the library selection IDE.

6. The computer-implemented method of claim 1, the networked computing environment comprising a cloud computing environment.

7. A system for program code library selection in a networked computing environment, comprising:
   a memory medium comprising instructions;
   a bus coupled to the memory medium; and
   a processor coupled to the bus that when executing the instructions causes the system to:
      receive a search results file in a library selection integrated development environment (IDE) from a library searching IDE, the search results file comprising at least one method and at least one class from a first program code file in the library searching IDE, and the search results file having a set of attributes;
      determine whether to perform a micro-benchmarking on the at least one method and the at least one class of the search results file, the determining being based on at least one of: a configuration of a second program code file in the library selection IDE, or a detected code pattern of the second program code file;

perform, responsive to the determination, the micro-benchmarking on the at least one method and the at least one class, and store an associated micro-benchmark time and an invocation timestamp in a computer storage device;

calculate a set of code style similarity scores that indicated a similarity between the at least one method and the at least one class with the methods and classes of the second program code file based on code syntax similarity; and provide an ordered list of the methods and classes of the second program code file based on the set of code style similarity scores, the micro-benchmarking, and the set of attributes.

8. The system of claim 7, the memory medium further comprising instructions for causing the system to select a program code library based on the ordered list.

9. The system of claim 7, the set of attributes comprising at least one of the following: a method and class name, an annotation, a popularity indicator, a rating indicator, a file size, an update frequency indicator, a last update timestamp, an indicator of popularity among a group of users, and a rating indicator among the group of users.

10. The system of claim 7, the code pattern comprising a complex code pattern.

11. The system of claim 7, the ordered list being provided to the library selection IDE.

12. The system of claim 7, the networked computing environment comprising a cloud computing environment.

13. A computer program product for program code library selection in a networked computing environment, the computer program product comprising a computer readable storage media, and program instructions stored on the computer readable storage media, to:

receive a search results file in a library selection integrated development environment (IDE) from a library searching IDE, the search results file comprising at least one method and at least one class from a first program code file in the library searching IDE, and the search results file having a set of attributes;

determine whether to perform a micro-benchmarking on the at least one method and the at least one class of the search results file, the determining being based on at least one of: a configuration of a second program code file in the library selection IDE, or a detected code pattern of the second program code file;

perform, responsive to the determination, the micro-benchmarking on the at least one method and the at least one class, and store an associated micro-benchmark time and an invocation timestamp in a computer storage device;

calculate a set of code style similarity scores that indicated a similarity between the at least one method and the at least one class with the methods and classes of the second program code file based on code syntax similarity; and provide an ordered list of the methods and classes of the second program code file based on the set of code style similarity scores, the micro-benchmarking, and the set of attributes.

14. The computer program product of claim 13, the computer readable storage media further comprising instructions to select a program code library based on the ordered list.

15. The computer program product of claim 13, the set of attributes comprising at least one of the following: a method and class name, an annotation, a popularity indicator, a rating indicator, a file size, an update frequency indicator, a last update timestamp, an indicator of popularity among a group of users, and a rating indicator among the group of users.

16. The computer program product of claim 13, the code pattern comprising a complex code pattern.

17. The computer program product of claim 13, the ordered list being provided to the library selection IDE.

18. The computer program product of claim 13, the networked computing environment comprising a cloud computing environment.

19. A method for deploying a system for program code library selection in a networked computing environment, comprising:

providing a computer infrastructure being operable to:
receive a search results file in a library selection integrated development environment (IDE) from a library searching IDE, the search results file comprising at least one method and at least one class from a first program code file in the library searching IDE, and the search results file having a set of attributes;

determine whether to perform a micro-benchmarking on the at least one method and the at least one class of the search results file, the determining being based on at least one of: a configuration of a second program code file in the library selection IDE, or a detected code pattern of the second program code file;

perform, responsive to the determination, the micro-benchmarking on the at least one method and the at least one class, and store an associated micro-benchmark time and an invocation timestamp in a computer storage device;

calculate a set of code style similarity scores that indicated a similarity between the at least one method and the at least one class with the methods and classes of the second program code file based on code syntax similarity; and provide an ordered list of the methods and classes of the second program code file based on the set of code style similarity scores, the micro-benchmarking, and the set of attributes.

20. The method of claim 19, the computer infrastructure being further operable to select a program code library based on the ordered list.

* * * * *